United States Patent [19]

Saito

[11] Patent Number: 5,502,097
[45] Date of Patent: Mar. 26, 1996

[54] FLUORORESIN POWDER LIQUID DISPERSION CAPABLE OF FORMING THICK COATINGS

[75] Inventor: Takumi Saito, Shizuoka, Japan

[73] Assignee: DuPont-Mitsui Fluorochemicals Co., Ltd., Tokyo, Japan

[21] Appl. No.: 249,585

[22] Filed: May 26, 1994

[30] Foreign Application Priority Data

Jun. 3, 1993 [JP] Japan ................................. 5-156378

[51] Int. Cl.$^6$ ............................. C08J 3/05; C08K 5/05; C08L 27/12
[52] U.S. Cl. ................ 524/389; 524/356; 524/361; 524/366; 524/379; 524/386; 524/492; 524/493; 524/494; 524/495; 524/496; 525/199; 525/200
[58] Field of Search ..................... 525/199, 200; 524/356, 361, 366, 379, 386, 389, 492, 493, 494, 495, 496

[56] References Cited

U.S. PATENT DOCUMENTS

| 5,093,403 | 3/1992 | Rau et al. | 524/404 |
| 5,349,003 | 9/1994 | Kato et al. | 524/458 |

FOREIGN PATENT DOCUMENTS

| 0737267 | 9/1955 | United Kingdom . |
| 2040293 | 8/1980 | United Kingdom . |

*Primary Examiner*—Paul R. Michl
*Assistant Examiner*—U. K. Rajguru

[57] ABSTRACT

A fluororesin powder liquid dispersion comprising heat-flowable fluororesin powder, liquid dispersion medium having a surface tension of not more than 45 dyne/cm, and organic liquid with a boiling point of 150°–340° C. provides thick film fluororesin treatment by a single application.

11 Claims, No Drawings

# FLUORORESIN POWDER LIQUID DISPERSION CAPABLE OF FORMING THICK COATINGS

FIELD OF THE INVENTION

The present invention relates to fluororesin powder liquid dispersion which is suitable for coating articles, specifically to a fluororesin powder liquid dispersion which does not undergo irreversible coagulation of the liquid dispersion and is capable of forming an extremely thick coated film.

BACKGROUND OF THE INVENTION

Heat flowable fluororesins having properties such as chemical resistance, nonstickiness, heat resistance, low coefficient of friction, and electrical insulation properties, are also capable of generating pinhole-free coated films and, thus, are useful as coating materials. Heat flowable fluororesins which are used in such coating applications include, for example, copolymers (PFA) of tetrafluoroethylene and perfluoro(alkyl vinyl ether), copolymers (FEP) of tetrafluoroethylene and hexafluoropropylene, copolymers (ETFE) of tetrafluoroethylene and ethylene, and the like. These resins, which are insoluble in water and organic liquids, defy use as solution-type coatings. For example, these resins are applied by an electrostatic application of a powder coating material or used as water-based liquid dispersions stabilized with surfactants and liquid dispersions based on organic liquids where the liquid dispersions are applied to substrates by means, such as spraying, immersing, casting, followed by heating and fusing to generate coated films.

The film coating obtained from electrostatic coating is normally about 50–100 μm thick, while the liquid dispersion coating material gives normally a 20 μm thick film coating. However, this level of thickness is not a sufficient thickness for anticorrosion applications, which leads to the demand for developing a coating material capable of generating a thicker coated film.

In order to solve the above problems, the applicant of this invention previously proposed (Japanese Patent Application Publication 57-15607) a fluororesin liquid dispersion for a thick film coating application comprising a heat flowable fluororesin powder having an average particle size of 2–300 μm and a porosity of not more than 0.74 in a liquid dispersing medium having a surface tension of not more than 45 dyne/cm. This proposal now permits generating a thick 500 μm film if the coated surface is level, but vertical surfaces, or the like, have created problems in that the fluororesin powder would fall off from the coated surface.

For applications requiring corrosion resistance, such as at chemical plants, where the performance is approximately dependent upon the thickness of the film, coating compositions and methods of coating which can form thick films even on vertical surfaces have been desired.

SUMMARY OF THE INVENTION

The present inventors discovered that incorporating in the liquid dispersion an organic liquid having a high boiling point permits the formation of thick films, because the heat flowable fluororesin powder in the liquid dispersion is held on the surface to be coated until the powder is melted by the heat of sintering and the powder particles begin to fuse with each other without sloughing off. Incorporation in the liquid dispersion of heat flowable fluororesin microparticles having an average particle size of not more than 0.5 μm and/or not more than 65% by volume of the total solids of fibrous heat resistant filler having a fiber length of at least 20 μm, and an aspect ratio of at least 2, provides a further degree of improvement.

Thus, this invention provides a fluororesin powder liquid dispersion which can be coated by a single film-forming step using a simple spray, or the like, to give a thick coating of 100–1500 μm in thickness with excellent corrosion resistance even when applied to a vertical surface, or the like.

The fluororesin powder liquid dispersion comprises 5–50% by volume based on the liquid dispersion of a heat-flowable fluororesin powder having an average particle size of 5–300 μm, a porosity of not higher than 0.74 and a total surface area of not greater than 10 m$^2$/cm$^3$ and liquid dispersion medium having a surface tension of not more than 45 dyne/cm, further comprising 10–40% by weight based on the heat flowable fluororesin powder of an organic liquid with a boiling point of 150°–340° C.

DETAILED DESCRIPTION

The heat flowable fluororesin liquid dispersion of this invention, comprised of a liquid dispersion containing an organic liquid having a specific boiling point, now prevents the coating powder from sloughing off during drying or sintering, thus enabling a thick film application. The advantageous effect is made even more substantial by adding to the fluororesin powder liquid dispersion: (a) heat flowable fluororesin microparticles having an average particle size of not more than 0.5 μm, and/or (b) a fibrous heat resistant filler having a fiber length of at least 20 μm, and an aspect of ratio of at least 2. Coating a substrate with the liquid dispersion can provide the substrate with corrosion resistance, non-stickiness, chemical resistance, wear resistance, electrical insulation properties, and the like, which are useful in chemical plants, the mechanical industry, and the electrical industry.

Heat flowable fluororesins which can be used in this invention are copolymers of tetrafluoroethylene and other comonomers which melt and liquify to flow at temperatures beyond their melting points, such as copolymers (PFA) of tetrafluoroethylene and perfluoro(alkyl vinyl ether) such as perfluoro(propyl vinyl ether), copolymers (FEP) of tetrafluoroethylene and hexafluoropropylene, copolymers (ETFE) of tetrafluoroethylene and ethylene, and the like. "Heat flowable" as used herein means that the fluororesin is melt fabricable, and as such, the fluororesin particles will flow and fuse together upon heating above their melting temperature.

The heat flowable fluororesin powder used in this invention has an average porosity of not more than 0.74, preferably a porosity of 0.34–0.65. A porosity greater than 0.74 would give a coated film with a tendency towards crack formation or loss of surface smoothness. By the term porosity referred to in this invention it is meant the volume of space in a powder layer expressed by the following formula:

Porosity=1–(Apparent Density of the Powder/True Density of the Material Constituting the Power)

A heat flowable fluororesin powder having a surface area of not more than 10 m$^2$/cm$^3$ resists breakage when it is stirred for dispersion in a dispersing medium or when it is sprayed from a sprayer and is capable of being redispersed easily by stirring if the powder were to precipitate and separate in the dispersion medium. If the powder is broken, i.e., if the individual powder particles are broken into finer particles, it causes cracks or the formation of uneven thickness films. A poor dispersion would make it difficult to obtain a liquid dispersion of a given concentration, as a result thereby preventing the formation of coated films with a given thickness.

The term total surface area referred to, in this invention means the total surface area (unit: m²/cm³) of a given resin powder per unit volume of the resin and can be determined by the following formula:

Total Surface Area=(Total Surface Area Per Gram of Powder)× (Resin Specific Weight)

The total surface area per gram of the powder is obtained by the BET method.

Such a heat flowable fluororesin powder having an average particle size of 5–300 μm, a porosity of not more than 0.74 and a total surface area of not more than 10 m²/cm³ can be prepared, as described, for example, in Japanese Patent Application Publication 53-11296, by spraying the copolymer powder together with a gas flow into a sintering chamber, the environment of which is held at a temperature not lower than the melting point of the copolymer under conditions which do not cause the individual particles to fuse with each other. It can also be prepared, as disclosed in Japanese Patent Application Publication Kokai 4-202329 by coagulating colloidal particles, semi-melting the particles and pulverizing them. Thus, the powder used in the liquid dispersion of the present invention can be an agglomeration of smaller particles.

The fluororesin powder contained in the liquid dispersion used in this invention having an average particle size exceeding 300 μm tends to generate coated films with pinhole formation, while a powder with an average particle size less than 5 μm will give a thick film having a film surface with a tendency towards crack formation, so that the dispersed heat flowable fluororesin powder should be selected from powders which will give an average particle size of 5–300 μm.

The fluororesin powder liquid dispersion of this invention has a concentration of 5–50% by volume, based on the liquid dispersion, of the heat flowable fluororesin powder. A resin concentration of greater than 50% by volume gives a liquid dispersion with poor flow and, thus, is not preferred because, for example, in a coating application, it becomes difficult to obtain a uniform coated film by casting coating or immersion coating, or else it requires a higher spray pressure in the case of spray coating. A resin concentration of less than 5% by volume would resist the formation of thick films, and would require a large amount of a fluororesin powder liquid dispersion resulting in longer drying time, which makes such a range economically unfavorable.

The dispersion media used in this invention have surface tensions of not more than 45 dyne/cm. The use of a multi-component dispersing medium requires the dispersion media to be mutually compatible and the surface tension of the mixed dispersion media to be not more than 45 dyne/cm. Exceeding a surface tension of 45 dyne/cm means an inability to sufficiently wet the powder of this invention, resulting in an unstable liquid dispersion. Surface tension is measured at room temperature (20° C.).

The dispersion media having surface tensions of not more than 45 dyne/cm can be organic liquids, which include aliphatic hydrocarbons, such as hexane and heptane; aromatic hydrocarbons, such as benzene and toluene; alcohols, such as methanol, ethanol, isopropyl alcohol and t-butyl alcohol; ketones, such as acetone and MEK, and mixtures thereof.

The fluororesin powder liquid dispersion of this invention must be prepared not only with the above dispersion medium, but also with an organic liquid having a boiling point of 150°–340° C. to be added to it. Organic liquids (hereafter sometimes called high boiling organic liquids) having boiling points of 150°–340° C. include, for example, ethylene glycol, diethylene glycol, glycerine, polyethylene glycol, glycol ethers, N-methyl pyrrolidone, isobutyl benzene, triethanol amine, kerosine, and mixtures thereof.

Organic liquids having boiling points within the above range are retained between the resin powder particles even during the heating step in a coating application, acting as a liquid crosslinker to prevent the resin powder from sloughing off the coated substrate, without remaining in the coating after fusing, so that a high quality fluororesin coated film can be obtained. The use of dispersion media having boiling points not higher than 150° C. alone is not preferred because the resin powder would slough off, while the use of a dispersion medium having a boiling point of 340° C. or higher tends to cause crosslinking or discoloration.

The amount of an organic liquid having a boiling point of 150°–340° C. to be added varies, depending upon the concentration of the liquid dispersion containing a heat flowable fluororesin powder, the type of dispersion medium, the goal coated film thickness, the heating rates for drying and sintering, and the like, but should be 10–45% by weight based on the heat flowable fluororesin powder. A level below 10% by weight tends to cause the powder to slough off during drying and sintering, while a level greater than 45% by weight sometimes fails to generate films.

In view of the working environmental conditions, such as flammability, etc., the dispersion media and the high boiling organic liquids to be used in a mixture are preferably water soluble organic liquids; such liquid dispersion media are preferably specifically illustrated by alcohols, such as ethanol, isopropyl alcohol, t-butyl alcohol; and high boiling organic liquids are illustrated by ethylene glycol, glycerine, polyethylene glycol, and mixtures thereof. Water may also be present. As the proportion of water increases, the film coating efficiency deteriorates, so that the mixing ratio should be determined by considering the purpose of the operation, the goal film thickness, and the like.

The preferred embodiment of this invention contains heat flowable fluororesin microparticles having an average particle size of not more than 0.5 μm. The heat flowable fluororesin microparticles having an average particle size of not more than 0.5 μm are preferably those which have their heat fusion initiation temperatures not higher than for the heat flowable fluororesin powder having an average particle size of 5–300 μm, which is used for generating the coated surface. That is, these microparticles are suitably PFA if the heat flowable fluororesin having an average particle size of 5–300 μm is PFA, can be, for example, FEP or ETFE for FEP, but preferably they should be made of the same resin as the heat flowable fluororesin powder having an average particle size of 5–300 μm. Even if the same resin is used, the heat flowable fluororesin particle having an average particle size of not more than 0.5 μm will melt before the heat flowable fluororesin powder having an average particle size of 5–300 μm in the steps from drying to fusing, so as to be effective in film formation.

In order to obtain these heat flowable fluororesin microparticles, use can be made of an aqueous liquid dispersion obtained by emulsion polymerization. Heat flowable fluororesin microparticles, if their average particle size is 0.5 μm or more, such particles will have a small effect of fusing the heat flowable fluororesin powder having an average particle size of 5–300 μm with each other.

The amount of these heat flowable fluororesin microparticles added is preferably not more than 40% by weight with respect to the heat flowable fluororesin powder having an average particle size of 5–300 μm. A level higher than 40% by weight, particularly when using FEP with PFA, will cause frothing or poor surface smoothness for the film generated, in addition, will cause mud cracking.

In order to generate a good coating during drying in which the heat flowable fluororesin powder does not slough off from the coated surface, the fluororesin powder liquid dispersion of the present invention can include a fibrous heat resistant filler having a fiber length of at least 20 μm and an aspect ratio of at least 2. This effect may be rationalized as the entanglement of a large particle size heat flowable fluororesin powder with the filler, being effective for preventing the film from sloughing off and for relaxing any strains generated because of the difference in thermal expansion or thermal shrinkage between the substrate and the resin during film formation. A fiber length less than 20 μm and an aspect ratio less than 2 will mean a lesser effect in preventing the film from sloughing off. The fiber content is preferably not more than 65% by volume with respect to the total solids, including the heat flowable fluororesin powder and the filler. A level beyond 65% by volume will result in too many voids to provide a uniform film with ease. The fibers specifically include, for example, inorganic fibers, such as glass, carbon, rockwool, ceramics, and potassium titanate whiskers, and so on; and organic fibers, such as aramid fibers, and the like.

These fibrous heat resistant fillers may be used alone or with the above-mentioned heat flowable fluororesin microparticles.

The fluororesin powder liquid dispersion of this invention may incorporate fillers other than the above fibrous fillers. Such fillers include inorganic materials, such as metal powders, metal oxides, glass beads, ceramics, silicon carbide, carbon black, and graphite, and heat resistant plastics, such as PPS, PEEK, aramid, and Ekonol®. These fillers together with the above fibrous heat resistant fillers or by themselves may be compounded, but they preferably should have a heat resistance of at least 200° C., preferably at least 300° C. and should not promote the decomposition of the heat flowable fluororesin. Incorporating 0.01–1% by weight of PPS having an average particle size not more than 20 μm is effective for suppressing the frothing of the coated films in case there is any thermal decomposition of the fluororesin powder.

A filler-loaded liquid dispersion coating can be obtained by introducing a filler when mixing the copolymer resin powder with the dispersing medium. In particular, a pigment aimed at coloration provides a brilliant coloration because the present invention does not use a surface-active agent, as in the case of the conventional liquid dispersions, so that there is no residue thereof after sintering. Adding an electrically conducting material, such as carbon black, graphite, or other metals or metal oxides, renders the coated film electrically conducting and can also function by the addition of only a small amount of such material.

If the fluororesin powder liquid dispersion is to be applied by spraying, the dispersion preferably should have a viscosity of about 8–14 seconds in terms of a Zahn Cup No. 4 (Toyoseiki Company), so as to prevent the liquid from being too thin when sprayed, thereby causing liquid dripping; or from being too concentrated, thereby causing the coating to be uneven.

The fluororesin powder liquid dispersion obtained by this invention is suitable for applications aimed at corrosion resistance, nonstickiness, wear resistance, or electrical insulation applications by selecting the filler types and their amounts or by over-coating with a filler-loaded coating material or by a diagonal coating method. For example, applications involving corrosion resistance include substrates such as reactor kettles, stirrer blades, baffles, and heat exchanger pipes; abrasion resistant applications include hoppers, shutters, compressor rotors, paper-making rollers, mold releases, or sliding materials; and electrical insulation applications include electrodes, and the like.

EXAMPLES

The present invention is illustrated by the following examples. The following is a description of the starting materials, such as resin, dispersion media, and the like, coated film formation test procedures, the methods for evaluating the coating film physical properties, and the like.

(1) Starting Materials (a) Heat Flowable Fluororesin Powders Having an Average Particle Size of 5–300 μm

|  | Average Particle Size | Porosity | Total Surface Area |
|---|---|---|---|
| PFA Powder-1 | 19 μm | 0.46 | 0.7 m$^2$/cm$^3$ |
| PFA Powder-2 | 28 μm | 0.64 | 0.6 m$^2$/cm$^3$ |
| FEP Powder | 45 μm | 0.47 | 0.4 m$^2$/cm$^3$ |
| ETFE Powder | 22 μm | 0.46 | 0.7 m$^2$/cm$^3$ |

(b) Heat Flowable Fluororesin Microparticles Having an Average Particle Size of Not More Than 0.5 μm

| PFA Particles | 28% by Weight Aqueous Dispersion of PFA Having an Average Particle Size of 0.16 μm |
|---|---|
| FEP Particles | 28% by Weight Aqueous Dispersion of FEP Having an Average Particle Size of 0.20 μm |

Particle properties were measured by the following methods:
(1) Average Particle Size
 (a) Resin Powder Having an Average Particle Size of 5–300 μm
  Micro-Track Method: Measured with a Micro-track Particle Size Analyzer Model 7991–01, a product of Leeds and Northrup Company.
 (b) Resin Microparticles Having an Average Particle Size of Not More Than 0.5 μm
  Turbidity Method: Measured with a Shimadzu Multi-Purpose Automatic Recording Spectrometer (Halogen Lamp).
(2) Total Surface Area
 The total surface area=total surface area per gram of powder×resin specific weight.
 The surface area per gram of the powder was measured by the BET method.
 (c) Dispersion Media

|  | Boiling Point | Surface Tension |
|---|---|---|
| Ethyl Alcohol | 78.3° C. | 24.0 dyne/cm |
| t-Butyl Alcohol | 82.5° C. | 22.2 dyne/cm |

(d) High Boiling Organic Liquids

|  | Boiling Point | Surface Tension |
|---|---|---|
| Ethylene Glycol (EG) | 197.8° C. | 50.2 dyne/cm |
| Glycerine | 290° C. | 63.4 dyne/cm |
| PEG200 (Lion K.K. Polyethylene Glycol) | About 314° C. | 44.5 dyne/cm |

(e) Fibrous Heat Resistant Fillers

| | |
|---|---|
| CF100 | Kureha Kagaku K.K., Carbon Fiber M2007S (100 μm long and 14.5 μm in diameter) |
| CF200 | Kureha Kagaku K.K., Carbon Fiber M204S (200 μm long and 14.5 μm in diameter) |
| GF140 | Nippon Denki Glass Company, Glass Fiber EPG140M (140 μm long and 9 μm in diameter) |
| GF200 | Nippon Denki Glass Company, Glass Fiber EPG200M (200 μm long and 9 μm in diameter) |

(f) Other Fillers

| | |
|---|---|
| PPS | Toso Susteel K.K., Ryton® V-1 Crushed Product (Average Particle Size, 14 μm) |

(2) Coated Film Formation Test (a) Direct Coating

A 1 mm thick×50 mm wide×100 mm long SUS sheet was spray coated with a fluororesin powder liquid dispersion to the extent corresponding to the desired film thickness, and was placed in a hot air forced circulation oven with the coated surface facing downward at an angle of 45°, dried and sintered at the temperature cycles given in the following Tables 1 and 2, thereby generating films. Film formation and the way the film sloughed off were observed at each temperature.

(b) Priming Treatment Coating

A PTFE emulsion polymerization liquid dispersion and a PFA emulsion polymerization liquid stabilized by a surface active agent were mixed together at a ratio of PTFE:PFA=1:1 based on the resin content, and this mixture was coated (7–10 μm thick) onto a substrate, followed by coating thereon a fluororesin powder liquid dispersion by the above method.

Temperature Cycles

TABLE 1

(1) ETFE and FEP

| Film Thickness of About 300–500 μm | Film Thickness of About 700–1500 μm |
|---|---|
| Dried 20 min at 90° C. followed by heating to 110° C. over 2 min | Dried 30 min at 90° C. followed by heating to 110° C. in 2 min |
| Dried 10 min at 110° C. followed by heating to 160° C. over 2 min | Dried 15 min at 110° C. followed by heating to 160° C. over 2 min |
| Dried 10 min at 160° C. followed by heating to 210° C. over 2 min | Dried 15 min at 160° C. followed by heating to 210° C. over 2 min |
| Dried 10 min at 110° C. followed by heating to 260° C. over 3 min | Dried 15 min at 210° C. followed by heating to 260° C. over 3 min |
| Dried 20 min at 260° C. followed by heating to 300° C. over 3 min | Dried 30 min at 260° C. followed by heating to 300° C. over 3 min |
| Sintered 10 min at 300° C. | Sintered 15 min at 300° C. |

TABLE 2

(2) PFA

| Film Thickness of About 300–500 μm | Film Thickness of About 700–1500 μm |
|---|---|
| Dried 20 min at 90° C. followed by heating to 110° C. over 2 min | Dried 30 min at 90° C. followed by heating to 110° C. in 2 min |
| Dried 10 min at 110° C. followed by heating to 160° C. over 2 min | Dried 15 min at 110° C. followed by heating to 160° C. over 2 min |
| Dried 10 min at 160° C. followed by heating to 210° C. over 2 min | Dried 15 min at 160° C. followed by heating to 210° C. over 2 min |
| Dried 10 min at 110° C. followed by heating to 260° C. over 3 min | Dried 15 min at 210° C. followed by heating to 260° C. over 3 min |
| Dried 20 min at 260° C. followed by heating to 310° C. over 3 min | Dried 30 min at 260° C. followed by heating to 300° C. over 3 min |
| Dried 20 min at 310° C. followed by heating to 340° C. over 20 min | Dried 30 min at 310° C. followed by heating to 340° C. over 20 min |
| Sintered 10 min at 340° C. | Sintered 15 min at 340° C. |

(3) Method for Evaluating Physical Properties (a) Film formation and the manner in which the film sloughed off were rated by the following two steps using visual inspection:

O: Films having a desired thickness were formed;

X: The resin powder sloughed off during drying and was unable to reach the desired coating film thickness.

(b) Film Thickness: Measured by a micrometer.

(c) IPA Test

A drop of isopropyl alcohol was dropped onto a sintered coated film and the following two-step rating was given by the ratio of disappearance time for the liquid from the film surface by penetration (B) to the air drying time (A). Penetration was in 2–3 seconds with a porous surface while an air drying time (A) is 8–9 minutes.

| X (Porous): | B/A < 1/2 |
|---|---|
| O (Non-porous): | B/A > 1/2 |

(d) Dispersion Stability Test for Liquid Dispersions 10 mL of a test liquid dispersion of a fluororesin was placed in a 20 mL test tube with a stopper and was allowed to stand for 24 hours at room temperature, thereby the amount of sedimentation was measured, followed by tumbling the test tube up and down while giving an impact to the test tube and measuring the number of up and down tumblings necessary for redispersion.

Parts cited in examples to follow are parts by weight.

EXAMPLE 1

A fluororesin powder liquid dispersion was prepared by mixing 10 parts of an ETFE powder having an average particle size of 22 μm, a porosity of 0.46, and a surface area of 0.7 $m^2/cm^3$, 2.5 parts of t-butyl alcohol, 2.5 parts of ethanol, 1.5 parts of polyethylene glycol (PEG), and 6 parts of water. The resultant fluororesin powder liquid dispersion, without priming, was directly coated onto a piece of stainless steel sheet according to the above coated film forming test procedure (2) followed by sintering and evaluating the physical properties of the film generated. The coated film had a thickness of 310 μm, showed no penetration according to the IPA test, and had excellent film surface smoothness. Table 3 summarizes the recipe for the resin powder liquid dispersion and coated film physical properties.

EXAMPLES 2–3

Fluororesin powder liquid dispersions were prepared according to the recipes given in Table 3 using as the heat flowable fluororesin powder an FEP powder having an average particle size of 45 μm, a porosity of 0.47, and a surface area of 0.4 m$^2$/cm$^3$, ethylene glycol and glycerine as the high boiling organic liquids and PPS as the filler in an amount of 0.1% by weight of that of the FEP powder, followed by coating and sintering according to the coated film-forming test procedure (2) in a manner similar to that of Example 1. The coated film had a thickness of 310–320 μm and also had excellent film surface smoothness. The results are shown in Table 3.

EXAMPLE 4

A fluororesin powder liquid dispersion was prepared according to the recipe given in Table 3 using as the heat flowable fluororesin powder an FEP powder having an average particle size of 45 μm, a porosity of 0.47, and a surface area of 0.4 m$^2$/cm$^3$ and CF100 (Kureha Kagaku Carbon Fiber) as the fibrous filler and PPS as the filler, followed by coating and sintering in a manner similar to that of Example 1. The coated film had a thickness of 340 μm and had excellent film surface smoothness. The results are summarized in Table 3.

EXAMPLE 5

A fluororesin powder liquid dispersion was prepared according to the recipe given in Table 3 using as the heat flowable fluororesin powder a PFA powder having an average particle size of 28 μm, a porosity of 0.64, and a surface area of 0.6 m$^2$/cm$^3$ and as the heat flowable fluororesin microparticles FEP particles in the form of a 28% by weight based on FEP and water combined, of an aqueous dispersion of FEP having an average particle size of 0.20 μm, and PPS as the filler, followed by coating and sintering in a manner similar to that of Example 1. The coated film had a thickness of 340 μm and was not discolored and had excellent film surface smoothness. The results are summarized in Table 3.

EXAMPLE 6

A fluororesin powder liquid dispersion was prepared according to the recipe given in Table 4 using, as the heat flowable fluororesin powder and heat flowable fluororesin microparticles, the same PFA powder and FEP aqueous dispersion as that used in Example 5, and as the fibrous filler CF100, followed by coating and sintering in a manner similar to that of Example 1. The coated film had a thickness of 340 μm and was not discolored and had excellent film surface smoothness. The results are summarized in Table 4.

EXAMPLE 7

A fluororesin powder liquid dispersion was prepared according to the recipe given in Table 4 using, as the heat flowable fluororesin powder, the same ETFE powder as that used in Example 1, but adding no heat flowable fluororesin micropowder, but adding a fibrous filler (CF200) and PPS, followed by coating and sintering in a manner similar to that of Example 1. This gave a coated film had a thickness of 530 μm and excellent film surface smoothness. The results are summarized in Table 4.

EXAMPLES 8–10

Preprimed and treated substrates were sprayed with heat flowable fluororesin powder liquid dispersions prepared according to the recipes given in Tables 4 and 5 to generate films about 1,000 μm or 1,500 μm thick where every film prepared showed excellent surface smoothness. The results are summarized in Tables 4 and 5.

EXAMPLE 11

A substrate without a priming treatment was coated with a heat flowable fluororesin powder liquid dispersion prepared according to the recipe shown in Table 5 to a thickness of 1500 μm. This gave a coated film having excellent surface smoothness. The results are summarized in Table 5.

CONTROL EXAMPLE 1

The same recipe as that used in Example 1 was used to prepare a fluororesin powder liquid dispersion except for not adding any PEG, followed by coating and sintering to provide the goal thickness of 300 μm in a manner similar to that of Example 1. However, the fluororesin powder sloughed off during drying, failing to form a coated film. The results are summarized in Table 6.

CONTROL EXAMPLE 2

The same recipe as that used in Example 2 was used to prepare a fluororesin powder liquid dispersion, except for adding no ethylene glycol, and to coat and sinter to achieve the goal thickness of 300 μm in a manner similar to that of Example 2. However, the fluororesin powder sloughed off during drying, failing to provide a coated film. The results are summarized in Table 6.

CONTROL EXAMPLE 3

A fluororesin powder liquid dispersion was prepared by the same recipe as that used in Example 5, except for not adding any of the high boiling organic liquid PEG and the heat flowable fluororesin powder FEP powder, and coated and sintered in a manner similar to that of Example 5 to achieve the goal thickness of 300 μm. However, the fluororesin powder sloughed off during drying, failing to provide a coated film. The results are summarized in Table 6.

CONTROL EXAMPLE 4

A liquid dispersion was prepared using as the heat flowable fluororesin the same FEP powder as that used in Example 2, but using the recipe shown in Table 6, adding a larger amount of glycerine to a dispersion medium comprising t-butanol and ethanol, thereby dispersing the FEP powder therein and coating and sintering to achieve the goal thickness of 300 μm in a manner similar to that of Example 2. However the fluororesin powder sloughed off during drying, failing to form a coated film. The results are summarized in Table 6.

CONTROL EXAMPLE 5

A fluororesin powder liquid dispersion was prepared by the same recipe as that used in Example 4, except for not adding ethylene glycol, coating and sintering in order to achieve the goal thickness of 300 μm in a manner similar to that of Example 4. However, the fluororesin powder sloughed off during drying, failing to provide a coated film. The results are summarized in Table 7.

CONTROL EXAMPLE 6

A fluororesin powder liquid dispersion was prepared by the same recipe as that used in Example 5 except for not adding any PEG, coating and sintering in order to achieve the goal thickness of 300 μm; however, the fluororesin powder sloughed off during drying, failing to provide a coated film. The results are summarized in Table 7.

CONTROL EXAMPLE 7

A fluororesin powder liquid dispersion was prepared using as the heat flowable fluororesin powder the same PFA powder as that used in Example 9, but adding no PEG and dispersing in a dispersion medium comprising t-butyl alcohol and ethanol according to the recipe shown in Table 7, to coat a substrate which had been prime-treated in a manner similar to that of Example 9, following by sintering to achieve the goal thickness of 800 μm, however, the fluororesin powder sloughed off during drying, failing to provide a coated film. The results are summarized in Table 7.

TABLE 3

|  | Exam. 1 | Exam. 2 | Exam. 3 | Exam. 4 | Exam. 5 |
|---|---|---|---|---|---|
| Liquid Dispersion Composition (parts by weight): | | | | | |
| A PFA-1 | | | | | 10 |
| PFA-2 | | | | | |
| FEP | | 10 | 10 | 10 | |
| ETFE | 10 | | | | |
| B Ethanol | 2.5 | 2.5 | 2.5 | 2.5 | 2.5 |
| t-Butyl alcohol | 2.5 | 2.5 | 2.5 | 2.5 | 2.5 |
| Water | 6 | 1 | 1 | 3 | |
| C EG | | 2 | | 2 | |
| Glycerine | | | 4 | | |
| PEG200 | 1.5 | | | | 1.5 |
| D PFA Aqueous Dispersion | | | | | |
| FEP Aqueous Dispersion | | | | 2 | |
| E CF200 | | | | | |
| CF100 | | | | 2.5 | |
| GF140 | | | | | |
| GF200 | | | | | |
| F PPS | | 0.1 | 0.1 | 0.1 | 0.1 |
| Priming Treatment (yes or no) | no | no | no | no | no |
| Physic Properties: | | | | | |
| Film Formation | O | O | O | O | O |
| Film Thickness (μm) | 310 | 310 | 320 | 340 | 340 |
| Smoothness | O | O | O | O | O |

A: Heat flowable fluororesin powder having an average particle size of 5–300 μm.
B: Dispersing medium
C: An organic liquid having a boiling point of 180°–340° C.
D: Heat flowable fluororesin microparticles having an average particle size of not more than 0.5 μm (the amount added was 28% by weight; the weight of the aqueous dispersion).
E: Fibrous heat resistant filler
F: Other fillers

TABLE 4

|  | Exam. 6 | Exam. 7 | Exam. 8 | Exam. 9 | Exam. 10 |
|---|---|---|---|---|---|
| Liquid Dispersion Composition (parts by weight): | | | | | |
| A PFA-1 | 10 | | | | |
| PFA-2 | | | | 10 | 10 |
| FEP | | | 10 | | |
| ETFE | | 8 | | | |
| B Ethanol | 5 | 2.5 | 2.5 | 5 | 2.5 |
| t-Butyl alcohol | 5 | 2.5 | 2.5 | 5 | 2.5 |
| Water | 1.5 | 5 | 2 | 5 | 5 |
| C EG | | 1.5 | | | 2 |
| Glycerine | 2 | | 1.5 | 2 | 1 |
| PEG200 | 1.5 | | | | 1.5 |
| D PFA Aqueous Dispersion | | | | | 7 |
| FEP Aqueous Dispersion | 0.5 | | | 2 | |
| E CF200 | | 2 | | 2.5 | |
| CF100 | 2.5 | | 2.5 | | |
| GF140 | | | | | 3.3 |
| GF200 | | | | | 1 |
| F PPS | | 0.1 | 0.1 | 0.1 | 0.1 |
| Priming Treatment (yes or no) | no | no | yes | yes | yes |
| Physical Properties: | | | | | |
| Film Formation | O | O | O | O | O |
| Film Thickness (μm) | 340 | 530 | 930 | 950 | 900 |
| Smoothness | O | O | O | O | O |

TABLE 5

|  | Exam. 11 | Exam. 12 | Exam. 13 |
|---|---|---|---|
| Liquid Dispersion Composition (parts by weight): | | | |
| A PFA-1 | | | |
| PFA-2 | | 10 | 10 |
| FEP | | | |
| ETFE | 8 | | |
| B Ethanol | 2 | 2.5 | 2 |
| t-Butyl alcohol | 2 | 2.5 | 2 |
| Water | | 5 | 3 |
| C EG | 1.5 | 3 | 3 |
| Glycerine | | 0.6 | |
| PEG200 | | | |
| D PFA Aqueous Dispersion | | 7 | 14 |
| FEP Aqueous Dispersion | 2 | 1 | |
| E CF200 | | | |
| CF100 | 4 | 3.2 | 4.7 |
| GF140 | | | |
| GF200 | | | |
| F PPS | 0.1 | 0.1 | 0.1 |
| Priming Treatment (yes or no) | no | yes | yes |
| Physical Properties: | | | |
| Film Formation | O | O | O |
| Film Thickness (μm) | 1500 | 1500 | 1300 |
| Smoothness | O | O | O |

TABLE 6

|  | Control Exam. 1 | Control Exam. 2 | Control Exam. 3 | Control Exam. 4 |
|---|---|---|---|---|
| Liquid Dispersion Composition (parts by weight): | | | | |
| A PFA-1 | | | 10 | |
| PFA-2 | | | | |
| FEP | | 10 | | 10 |
| ETFE | 10 | | | |
| B Ethanol | 2.5 | 2.5 | 2.5 | 2.5 |
| t-Butyl alcohol | 2.5 | 2.5 | 2.5 | 2.5 |
| Water | 6 | 1 | | |

TABLE 6-continued

|  | Control Exam. 1 | Control Exam. 2 | Control Exam. 3 | Control Exam. 4 |
|---|---|---|---|---|
| C EG |  |  |  |  |
| Glycerine |  |  |  | 5 |
| PEG200 |  |  |  |  |
| D PFA Aqueous Dispersion |  |  |  |  |
| FEP Aqueous Dispersion |  |  |  |  |
| E CF200 |  |  |  |  |
| CF100 |  |  |  |  |
| GF140 |  |  |  |  |
| GF200 |  |  |  |  |
| F PPS |  | 0.1 | 0.1 | 0.1 |
| Priming Treatment (yes or no) | no | no | no | no |
| Physical Properties: |  |  |  |  |
| Film Formation | X | X | X | X |
| Film Thickness (μm) |  |  |  |  |
| Smoothness |  |  |  |  |

TABLE 7

|  | Control Exam. 5 | Control Exam. 6 | Control Exam. 7 |
|---|---|---|---|
| Liquid Dispersion Composition (parts by weight): |  |  |  |
| A PFA-1 |  | 10 |  |
| PFA-2 |  |  | 10 |
| FEP | 10 |  |  |
| ETFE |  |  |  |
| B Ethanol | 2.5 | 2.5 | 5 |
| t-Butyl alcohol | 2.5 | 2.5 | 5 |
| Water | 3 |  |  |
| C EG |  |  |  |
| Glycerine |  |  |  |
| PEG200 |  |  |  |
| D PFA Aqueous Dispersion |  |  |  |
| FEP Aqueous Dispersion |  | 2 |  |
| E CF200 |  |  | 2.5 |
| CF100 | 2.5 |  |  |
| GF140 |  |  |  |
| GF200 |  |  |  |
| F PPS | 0.1 | 0.1 | 0.1 |
| Priming Treatment (yes or no) | no | no | yes |
| Physical Properties: |  |  |  |
| Film Formation | X | X | X |
| Film Thickness (μm) |  |  |  |
| Smoothness |  |  |  |

CONTROL EXAMPLE 8 (DISPERSION STABILITY TEST)

A fluororesin powder liquid dispersion was prepared by adding a 0.2% aqueous solution of Triton® X100, a nonionic surfactant, to 5 g of PFA particles having an average particle size of 28 μm, a porosity of 0.64, and a surface area of 0.6 m$^2$/cm$^3$ to bring the volume to 10 mL. A dispersion stability test was carried out on this, and the fluororesin powder liquid dispersions obtained in Examples 1 and 5 were compared for their dispersion stabilities. The results are shown in Table 8.

TABLE 8

| Dispersion Stability Test | | |
|---|---|---|
|  | Sedimentation Volume (mL) 24 hr Later | No. of Up and Down Tumblings Necessary for Redispersing 24 hr Later |
| Example 1 | 7.6 | 2 |
| Example 5 | 8.5 | 2 |
| Control Example 8 | 5.0 | 100 or more |

What is claimed is:

1. A fluororesin powder liquid dispersion comprising 5–50% by volume based on the liquid dispersion of heat-flowable fluororesin powder having an average particle size of 5–300 μm, a porosity of not higher than 0.74 and a total surface area of not greater than 10 m$^2$/cm$^3$ and liquid dispersion medium having a surface tension of not more than 45 dyne/cm, further comprising 10–40% by weight based on the heat flowable fluororesin powder of an organic liquid with a boiling point of 150° C.–340° C., the heat flowability of said fluororesin powder being characterized by flow at temperatures beyond the melting point of the fluororesin of said powder.

2. A fluororesin powder liquid dispersion as set forth in claim 1 further comprising (a) not more than 40% by weight, with respect to the heat flowable fluororesin powder, of heat flowable fluororesin microparticles having an average particle size of not more than 0.5 μm and/or (b) not more than 65% by volume of the total solids of a fibrous heat resistant filler having a fiber length of at least 20 μm and having an aspect ratio of at least 2.

3. A fluororesin powder liquid dispersion as set forth in claim 2 in which the dispersion medium is comprised of water and a water soluble organic liquid.

4. The fluororesin powder liquid dispersion of claim 1 for use in single-film forming step to form a coating of 100 to 1500 μm in thickness.

5. The fluororesin powder liquid dispersion of claim 1 wherein said fluororesin is a copolymer of tetrafluoroethylene.

6. The fluororesin powder liquid dispersion of claim 5 wherein said tetrafluoroethylene is copolymerized with perfluoro(alkyl vinyl ether).

7. The fluororesin powder liquid dispersion of claim 5 wherein said tetrafluoroethylene is copolymerized with hexafluoropropylene.

8. The fluororesin powder liquid dispersion composition of claim 5 wherein said tetrafluoroethylene is copolymerized with ethylene.

9. The fluororesin powder liquid dispersion of claim 2 wherein said microparticles are present, and said filler is not present.

10. The fluororesin powder liquid dispersion of claim 9 wherein the fluororesin of said microparticles is the same as the fluororesin of said powder.

11. The fluororesin of claim 2 wherein both said microparticles and said filler are present.

* * * * *